US 8,473,413 B2

(12) United States Patent
Lyons et al.

(10) Patent No.: US 8,473,413 B2
(45) Date of Patent: Jun. 25, 2013

(54) METHODS AND SYSTEMS FOR MANAGING GOVERNMENT ISSUED ENTITLEMENTS

(71) Applicant: The Western Union Comany, Englewood, CO (US)

(72) Inventors: Dianna Lyons, Highlands Ranch, CO (US); Kellie Norden, Lonetree, CO (US)

(73) Assignee: The Western Union Company, Englewood, CO (US)

( * ) Notice: Subject to any disclaimer, the term of this patent is extended or adjusted under 35 U.S.C. 154(b) by 0 days.

(21) Appl. No.: 13/727,126

(22) Filed: Dec. 26, 2012

(65) Prior Publication Data

US 2013/0138541 A1    May 30, 2013

Related U.S. Application Data

(63) Continuation of application No. 11/759,731, filed on Jun. 7, 2007, now Pat. No. 8,355,986.

(51) Int. Cl.
*G06Q 40/00* (2006.01)

(52) U.S. Cl.
USPC .............................................. 705/40; 705/45

(58) Field of Classification Search
None
See application file for complete search history.

(56) References Cited

U.S. PATENT DOCUMENTS

2004/0039701 A1* 2/2004 Nakamura et al. .............. 705/42
2006/0229987 A1* 10/2006 Leekley .......................... 705/45

OTHER PUBLICATIONS

"More Direct Deposit Options", Internal Revenue Service, Feb. 8, 2007, pp. 1-2.*

* cited by examiner

*Primary Examiner* — Charles Kyle
*Assistant Examiner* — Chia Yi Liu
(74) *Attorney, Agent, or Firm* — Kilpatrick Townsend & Stockton LLP

(57) ABSTRACT

A method for designating accounts for funds from a check to be deposited is described. The method includes receiving, at a processing center having a processor, a direct deposit government entitlement check from a government entity to be deposited. The check may include an identifier. The method further includes comparing the identifier with a customer database to determine that funds from the check have been designated to be divided into sub-amounts and deposited into a plurality of accounts. Each of the plurality of accounts has account type and an associated expenditure designation. The method then receives a report of a total amount deposited from the check for each type of associated expenditure designation and each account type.

26 Claims, 4 Drawing Sheets

Customer Information 210

Title 214

Date 212

| Transaction Date 220 | Description 222 | Amount 224 | Account Name 226 | Account Type 228 | Type of Goods or Services 230 | Year-to-date total 232 | |
|---|---|---|---|---|---|---|---|
| 5/2/2007 | Entitlement check received | $550.00 | Social Security Entitlement Check | | | | |
| 5/3/2007 | Funds automatically transferred to Savings Account No. 0000000 | $300.00 | XYZ Bank Savings Account | Savings | Investment | $1,500.00 | 234 |
| 5/3/2007 | Funds automatically transferred to College Investment fund Account No. 0000000 | $100.00 | College Fund Account | Education | Investment | $500.00 | 236 |
| 5/4/2007 | Funds automatically transferred to Pre-paid MasterCard® Card No. 9999 9999 9999 9999 | $150.00 | MasterCard® | Credit card | Food and Clothing | $750.00 | 238 240 |

Itemized Reporting 250

| Type of good or services 242 | Year-to-date total 244 |
|---|---|
| Food and Clothing | $750.00 | 252
| Investment | $2,000.00 | 254

Instructions 260

Figure 2

METHODS AND SYSTEMS FOR MANAGING GOVERNMENT ISSUED ENTITLEMENTS

CROSS-REFERENCES TO RELATED APPLICATIONS

This application is a continuation of U.S. patent application Ser. No. 11/759,731 filed Jun. 7, 2007, entitled "METHODS AND SYSTEMS FOR MANAGING GOVERNMENT ISSUED ENTITLEMENTS." This reference is hereby incorporated by reference in its entirety for all purposes.

BACKGROUND OF THE INVENTION

This invention relates generally to government entitlement checks. More specifically the invention relates to designating amounts of government entitlement checks to be deposited into various accounts, and maintaining a record of each transaction relating to the government entitlement checks.

Currently, recipients of government entitlements checks (e.g. social security disability, veterans benefits, unemployment benefits, welfare benefits, food stamps, etc.) are unable to divide such checks between various accounts (e.g. checking, savings, debit card, investments, education fund accounts, IRAs, pre-paid MasterCard®, etc.). The recipient may either receive the entitlement by paper check, or direct deposit into an individual specified account. These restrictions present a problem for recipients that wish to plan for future needs (e.g. retirement, education, catastrophe, etc.) or better organize their finances.

Additionally, recipients of entitlement checks are often required to report to the appropriate government agency (e.g. Social Security Administration (SSA), Veterans Benefits Administration (VBA), the Department of Health and Human Services) how and on what entitlement funds are spent. Presently, precise tracking is difficult because currently no system is in place to properly categorize entitlement check expenditures. Furthermore, for most people manually tracking can be time intensive and inaccurate. Accordingly, the methods and systems of the present invention provide solutions to these and other problems.

BRIEF DESCRIPTION OF THE INVENTION

In one embodiment, a method for designating accounts for funds from a check to be deposited is described. The method includes receiving, at a processing center having a processor, a direct deposit government entitlement check from a government entity to be deposited. The check may include an identifier. The method further includes comparing the identifier with a customer database to determine that funds from the check have been designated to be divided into sub-amounts and deposited into a plurality of accounts. Each of the plurality of accounts has account type and an associated expenditure designation. The method then receives a report of a total amount deposited from the check for each type of associated expenditure designation and each account type.

In another embodiment, a system for designating accounts for funds from a check to be deposited is described. The system includes an account processing center that is configured to receive a government entitlement check from a government entity. The check includes an identifier. The account processing center is further configured to access a customer database to compare the identifier with customer information in the database to determine that funds from the check have been designated to be divided into sub-amounts and deposited into a plurality of accounts. Each of the plurality of accounts has an account type and an associated expenditure designation. The system further includes an account reporter configured to track deposited fund totals for each account type and to generate a report of a total amount deposited from the check for each type of associated expenditure designation and each account type.

In yet a further embodiment, a machine-readable medium including sets of instructions for designating accounts for funds from a check to be deposited is described. The machine-readable medium causes a machine to receive, at a processing center having a processor, a direct deposit government entitlement check from a government entity to be deposited. The check may include an identifier. The machine-readable medium further causes the machine to compare the identifier with a customer database to determine that funds from the check have been designated to be divided into sub-amounts and deposited into a plurality of accounts. Each of the plurality of accounts has account type and an associated expenditure designation. The machine-readable medium then causes the machine to receive a report of a total amount deposited from the check for each type of associated expenditure designation and each account type.

BRIEF DESCRIPTION OF THE DRAWINGS

The present invention is described in conjunction with the appended figures:

FIG. 2 illustrates a report according to one embodiment of the invention;

Figure 1:
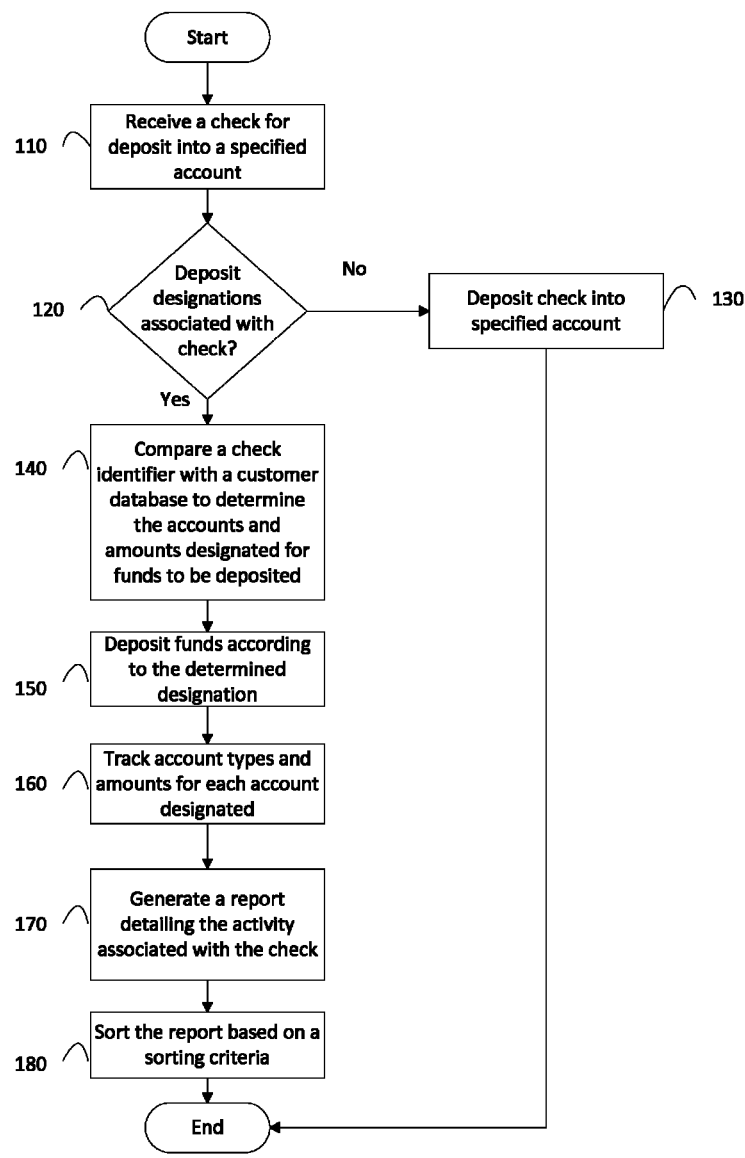
FIG. 1 is a flow diagram illustrating one embodiment of the present invention.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. In addition, a processor(s) may perform the necessary tasks.

One aspect of the invention enables a customer to make designations associated with a government issued entitlement check which specify where the check's funds will be deposited. The designations may include instructions indicating that upon receipt of the check by the customer's financial institution, the check's funds are divided into pre-specified amounts and deposited into pre-specified accounts. This gives a customer the freedom and flexibility to automatically select the final destination of their funds.

Due to the fact that government entities often require detailed reporting of how entitlement check funds are spent, a further aspect of the invention involves detailed tracking and reporting of expenditures for the government entitlement funds. For example, a customer may be given reports that detail a running yearly total reporting the accounts where the funds have been deposited, and the year-to-date totals for each account type. The reports may include a column or section which details the type of expenditure (e.g. food, clothing, education, medical, etc.) for each entry in the report. This information could be useful to the customer for year-end reporting of the expenditures of entitlement check funds to the appropriate government entity.

Turning now to FIG. 1, which illustrates a flow diagram of one embodiment of the present invention. At process block 110, a government entitlement check is received for deposit into a specified account. The deposit may be a manual deposit at an ATM, a branch teller, or a Western Union Money Transfer® location or the deposit may be a direct deposit or a prepaid MasterCard®. The direct deposit may be an electronic fund transfer which is routed directly into a customer's account. Further, the specified account may be a variety of account types (e.g. a checking account, a savings account, a credit account, investment account, etc.). However, the customer may designate a service to receive the funds. For example, a bill paying service may be designated such as Western Union Convenience Pay®, Quick Collect®, etc.

Once the check is received, identifying information associated with the check, and identifying information associated with the customer (e.g. an account number, a tracking number, etc.) is examined to determine the identity of the customer and if the customer has made any designations for checks that match the identifying information (decision block 120). In one embodiment, customer records may be maintained, and based on identification provided by the customer, the record is accessed and the customer information is retrieved. In a further embodiment, designations may include dividing portions of the check for deposit into a specified account.

Further, the identifying information may be the government entity that issued the check. The government entity may be the Social Security Administration (SSA), the Veterans Benefits Administration (VBA), the Department of Health and Human Services, etc. Nonetheless, the issuer of the check may be other government or non-government entities. In addition, authentication information (e.g. personal pin number, password, etc.) may be provided. The authentication information may be used to verify the identity of the customer and to protect against fraudulent transactions.

If there are no designations found, the check is deposited into the specified account according to the normal course of business (process block 130), and the process ends. However, if it is determined that designations have been associated with the check, then identifying information from the check is compared with a customer database to determine pre-specified accounts and the amount of the check to be transferred into the pre-specified accounts (process block 140). In one embodiment, the designations may designate that a certain percentage of the check be deposited into the pre-specified accounts. For example, 15% of the check may be deposited into a savings account, 45% may be deposited into a education fund, and the remaining 50% may be used to recharge a pre-paid MasterCard®. Nonetheless, other percentages and accounts may be designated in order to provide the customer with freedom and flexibility to transfer funds to a variety of accounts and/or account types.

At process block 150, the check's funds are divided and deposited according to the determined designations. In one embodiment, this process occurs automatically at a computing device. At process block 160, the account types, expenditure types and amount of funds are tracked. The tracking may include what type of goods or services the funds were spent on, or what type of accounts the funds where transferred to. Further, dates associated with each transaction may be tracked and year-to-date running totals of how the funds have been expended may also be tracked.

At process block 170, a report detailing the account activity associated with the check is generated. The report may be generated on a monthly, quarterly, semi-annual, or annual basis. The report may be accessed at a branch location, an automated teller machine (ATM), an Internet webpage, electronic mail (email), facsimile, a telephone service (e.g. an interactive voice response (IVR) system), or a mail service. In one embodiment, the branch location (e.g. branch location 354) may be a bank location of a financial institution (e.g. a bank) or the branch location may be a Western Union Money Transfer® location. Nonetheless, any location where financial transactions may be completed may be used. The customer may be able to designate the amount of information included in the report and the frequency the report is generated. In one embodiment, the report may be automatically transmitted to the appropriate government entity.

According to aspects of the invention, the report may include transaction dates, account types, account names, the government entity where the entitlement check originated, amounts of each transaction, year-to-date totals, etc. An example of one embodiment of the report is detailed in FIG. 2 discussed below. Furthermore, the report may be sorted according to a certain sorting criteria (process block 180). The sorting criteria may be a default criteria or may be defined by the customer. The criteria may be one or more of the categories included in the report, or other criteria may be used.

Turning now to FIG. 2 which illustrates a report according to aspects of the invention. The report may be received in a variety of formats (e.g. electronic, paper, etc.), and as discussed above the report may be accessed in a variety of manners. The report allows a customer to receive up-to-date information regarding government entitlement check funds. The report also assists the customer in tracking the disbursement and expenditure of the funds for convenient and accurate reporting to the appropriate government entity.

The report may include multiple columns and rows which provide pertinent information and functionality to the customer, in one embodiment, the columns and rows may be both searchable (when the report is in electronic form) and/or sortable. The customer may desire to search all transactions related to a given day, or sort all transactions by amount. Nonetheless, the report is customizable to meet the needs of the customer.

The report may include customer information 210, such information may include the customer's name, contact information, account information, etc. The report may also include a date 212. Date 212 may be the date the report was issued, or may be the date the report was generated. The report may include a title 214, which may identify the related government entity that generated the entitlement check. Further, title 214 may include additional information for document identification purposes.

Further, the report may include instructions 260. Instructions 260 may provide instructions to the customer on how to report year-end information to the associated government entity. These instructions may include a step-by-step process or may include a link or website address to instructions that the customer can access. Instructions 260 may also include contact information of the government entity. The contact information may include telephone and/or Internet contact information. Instructions 260 may be used by the customer to assist them in the reporting process to the appropriate government entity, which often can be difficult and confusing.

The report may further include various data columns. The columns may include transaction date 220, description 222, amount 224, account name 226, account type 228, type of goods or services 230 and year-to-date total 232. In one embodiment, the customer may select one or more of columns 220-232 to sort transactions 234-240. Transaction date column 220 may be used to indicate when each of transactions 234-240 occurred. Description column 222 may include a brief description of each transaction 234-240, and the description may also include transaction identifying information and related account information.

Amount column 224 may include the dollar (or other currency designation) amount associated with each transaction 243-240. Account name 226 indicates the name of the account associated with the transaction. Account type 228 may indicate the type of account the funds have been deposited into for each transaction 234-240. The account types may include savings, education, credit card, etc. Account type 228 may be used by the customer to assist in the year-end reporting process to the government entity.

Type of goods or services column 230 may include information about how the funds for transactions 234-240 where allocated. For example, if the funds were allocated to an college education fund account, then the type of good or service would be designated as an investment (see transaction 238). Further, if the funds were allocated to a pre-paid MasterCard®, then the type of good or service would be designated as food and clothing (see transaction 240). As with account type 228, type of goods or services 230 may be used by the customer to assist in the year-end reporting process to a government entity.

Year-to-date total column 232 may include a running yearly total for the amount of funds deposited into each account. For example, transaction 236 indicates that $1,500.00 have been deposited into the XYZ Savings Account since the beginning of the calendar year. Alternatively, or in addition to year-to-date column 232, other time designations may be used.

The customer may have the option of modifying the order of columns 220-232. Additionally, the customer may be able to remove any unwanted columns, or add additional customized columns. Furthermore, the customer may select one or more of the columns to sort transactions 234-240.

The report may further include an itemized reporting section 250. Itemized reporting section 250 ma include more detailed reports. For example, itemized reporting 250 may include columns type of goods or services 242 and year-to-date total 244. Entries 252 and 254 may include year-to-date totals for a given type of good or service. Itemized reporting 250 keeps track of goods or services deposited into any account associated with the corresponding good or service.

While specific columns and transaction details are included in FIG. 2, these specifics are for exemplary purposes only. It should be appreciated that additional or variations of the columns and/or transactions may be included in the report.

Figure 3:
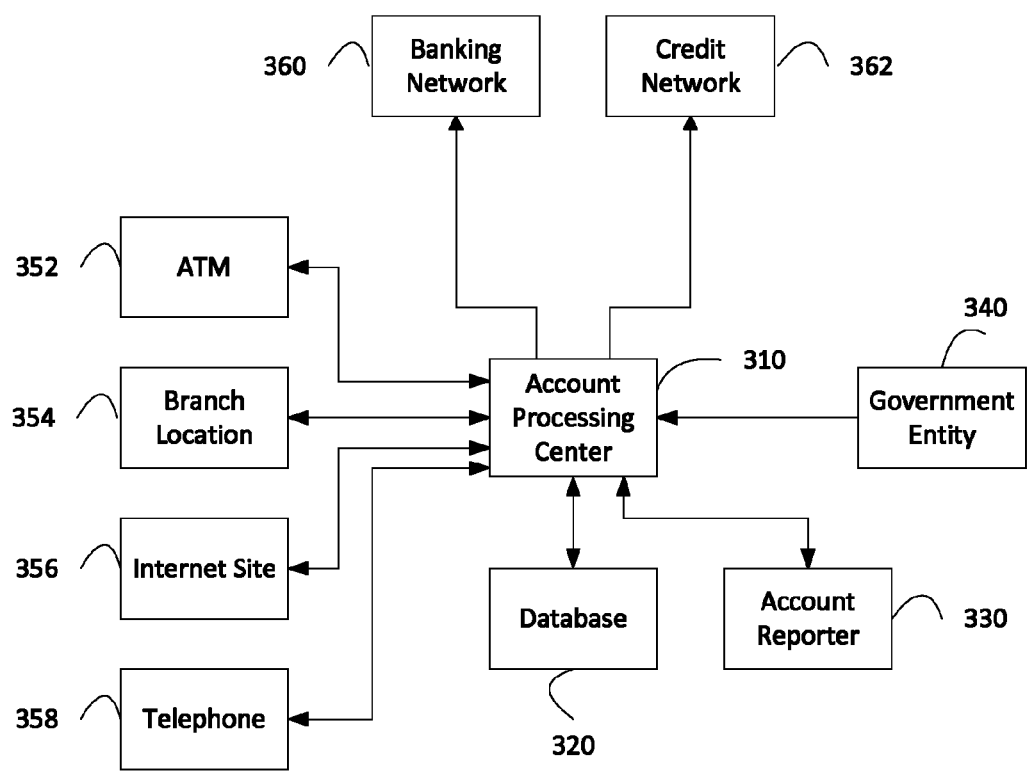
FIG. 3 is a block diagram illustrating one embodiment of the present invention.

Turning now to FIG. 3 which illustrates a financial transaction system according to aspects of the invention. Account processing center 310 may be configured to implement the method according to FIG. 1. Account processing center 310 receives a government entitlement check from a government entity 340. Upon receipt of the check, account processing center 310 queries database 320 to determine if any designations are associated with the check. Database 320 responds to the query from account processing center 310 by indicating any designations associated with the check. Based on the designations, account processing center 310 allocates funds from the entitlement check into the designated accounts.

According to one embodiment, the entitlement check designations may be received from any one of ATM 352, branch location 354, Internet site 356, or telephone 358. A customer may contact the account processing center 310 and set designations for a given type of entitlement check. Account processing center 310 then forwards the designations to database 320 for subsequent query each time a new entitlement cheek is received.

In one embodiment, account processing center 310 may be a Western Union Money Transfer® system. The Western Union Money Transfer® system may receive the check at location 354, or in some other way, and identification information from the check is compared with the depositing customer's records. A determination is made as to how and where the funds from the check should be transferred. Further, the money transfer system may be connected to a banking network 360 and a credit network 362.

In one embodiment, the money transfer system transfers funds according to the determined designations to either banking network 360 or credit network 362. Subsequently, the corresponding network deposits the funds into the designated accounts. The money transfer system (i.e. account processing center 330) collects data detailing how and where the funds were transferred.

Account reporter 330 receives account information (based on the collected data) updates from account processing center 310. The updates may include year-to-date information on how the funds for each type of entitlement check have been disbursed. This information may also include account types and amounts of where the funds have been disbursed. Account reporter 330 processes this information and generates reports based on the information. The reports may be similar to the report described in FIG. 2. However, variations of the report found in FIG. 2 may be generated.

The report is transferred to account processing center 310 where it can be delivered to the customer. The customer may also request the report from account processing center 310 via ATM 352, location 354, Internet site 356, or telephone 358.

Figure 4:
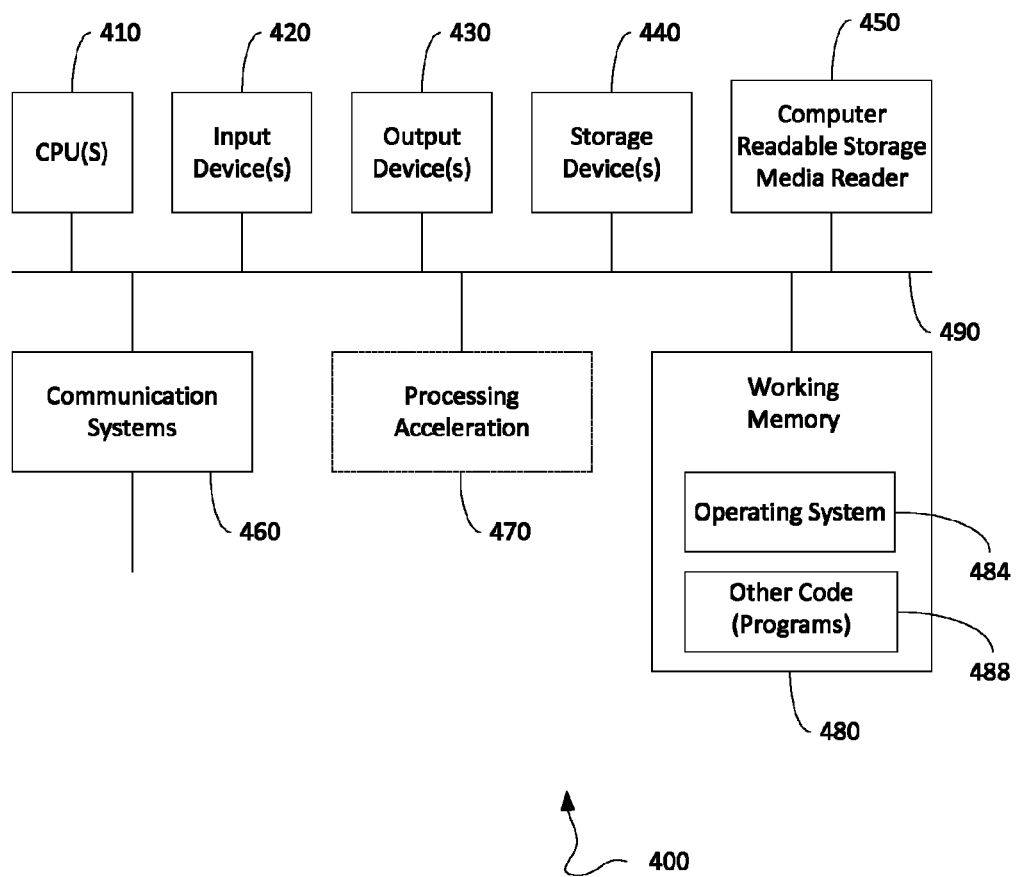
FIG. 4 is a block diagram illustrating an exemplary computer system used by embodiments of the present invention.

FIG. 4 is a block diagram illustrating an exemplary computer system 400 in which embodiments of the present invention may be implemented. This example illustrates a computer system 400 such as may be used, in whole, in part, or with various modifications, to provide the functions of account processing center 310, ATM 352, Internet site 356, database 320, account reporter 330, financial institution 340 and/or other components of the invention. For example, various functions of account processing center 310 may be controlled by the computer system 400, including, merely by way of example, receiving a check for deposit into a specified account (process block 110), determining the accounts and amounts designated for funds to be deposited (process block 140), etc.

The computer system 400 is shown comprising hardware elements that may be electrically coupled via a bus 490. The hardware elements may include one or more central processing units 410, one or more input devices 420 (e.g., a mouse, a keyboard, etc.), and one or more output devices 430 (e.g., a display device, a printer, etc.). The computer system 400 may also include one or more storage device(s) 440. By way of example, storage device(s) 440 may be disk drives, optical storage devices, solid-state storage device such as a random access memory ("RAM") and/or a read-only memory ("ROM"), which can be programmable, flash-updateable, etc.

The computer system 400 may additionally include a computer-readable storage media reader 450, a communications system 460 (e.g., a modem, a network card (wireless or wired), an infra-red communication device, Bluetooth™ device, cellular communication device, etc.), and working memory 480, which may include RAM and ROM devices as described above. In some embodiments, the computer system 400 may also include a processing acceleration unit 470, which can include a digital signal processor, a special-purpose processor, etc.

The computer-readable storage media reader 450 can further be connected to a computer-readable storage medium, together (and, optionally, in combination with storage device (s) 440) comprehensively representing remote, local, fixed, and/or removable storage devices plus storage media for temporarily and/or more permanently containing computer-readable information. The communications system 460 may permit data to be exchanged with as network, system, computer and/or other component described above.

The computer system 400 may also comprise software elements, shown as being currently located within a working memory 480, including an operating system 484 and/or other code 488. It should be appreciated that alternate embodiments of a computer system 400 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 400 may include code 488 for implementing any or all of the function of the various elements of the architecture as described herein. For example, software stored on and/or executed by a computer system such as system 400, can provide the functions of the account processing center 310 and/or other components of the present invention. Methods may be implemented by software on some of these components which have been discussed above in more detail.

A number of variations and modifications of the invention can also be used within the scope of the invention. For example, various steps of the methods discussed herein can be conducted by multiple processors in different orders than shown in FIG. 1. The invention has now been described in detail for the purposes of clarity and understanding. However, it will be appreciated that certain changes and modifications may be practiced within the scope of the appended claims.

What is claimed is:

1. A method for designating accounts for funds from a check to be deposited, the method comprising:

receiving, at a processing center having a computer processor, a direct deposit government entitlement check from a government entity to be deposited, wherein the check has an associated owner, wherein the check includes an identifier and the check further includes government mandated requirements restricting: division of the funds from the check into a plurality of deposit accounts, types of goods and services purchased by the funds of the check, reporting of expenditures to the government entity, and audit requirements for the owner of the check;

prior to depositing the funds from the check into any of a plurality of designated deposit accounts, comparing the identifier with a customer database to determine that funds from the check have been designated to be divided into sub-amounts;

dividing, by computer processor, the funds from the check into sub-amounts based on determination;

depositing the divided funds into the plurality of designated deposit accounts, each of the plurality of designated deposit accounts having an account type and an associated expenditure designation, wherein at least one of the designated deposit accounts is a pre-paid account;

based on information from the customer database, automatically depositing into at least one of the plurality of designated accounts at least a portion of the funds;

generating a report of a total amount deposited from the check of each type of associated expenditure designation and each account type;

automatically transmitting the report to the government entity and the owner of the check;

conforming to the government mandated reporting of expenditure associated with the check; and providing the owner of the check with information necessary to conform with the audit requirements.

2. The method of claim 1, wherein the check may be associated with a specified deposit account and further comprising:
if comparison of the identifier with a customer database determines that the check has not been designated to be divided into sub-amounts, depositing the check into the specified deposit account.

3. The method of claim 2, wherein the specified deposit account is a pre-paid account.

4. The method of claim 3, wherein the pre-paid account is a stored value account.

5. The method of claim 1, wherein the at least one of the designated accounts is a stored value account.

6. The method of claim 1, updating the customer database to reflect changes to the designations associated with the check.

7. The method of claim 1, wherein the associated expenditure designations include at least one of food and clothing, education, and investment.

8. The method of claim 1, wherein the check is a paper check.

9. The method of claim 1, wherein the report is accessed from at least one of a branch location of the financial institution, a money transfer location, an automated teller machine (ATM), the Internet, an electronic mail (email), a facsimile, a telephone service, and a mail service.

10. The method of claim 1, wherein the report is generated on at least one of a monthly, a quarterly, a semi-annual, and an annual basis.

11. The method of claim 10, further comprising based on the report, providing detailed accounting to the financial entity indicating usage of the funds.

12. The method of claim 11, wherein the detailed account information categories are selected from at least one categories: an account number, date of each transaction, an amount of each transaction, and the type of account.

13. The method of claim 12, further comprising sorting the plurality of entries by one or more of the detailed account information categories.

14. The method of claim 1, wherein the government agency is selected from at least one of agencies: the Social Security Administration (SSA), the Veterans Benefits Administration (VBA), and the Department of Health and Human Services.

15. The method of claim 14, further comprising automatically submitting the report to the government agency.

16. The method of claim 1, wherein the account type is at least one of a checking account, a savings account, a debit card, an investment account, an education fund account, and a pre-paid credit card.

17. A system for designating accounts for funds from a check to be deposited, the system comprising:
a storage memory; and
a computer processor in communication with the storage memory, wherein the storage memory has sets of instructions stored thereon which, when executed by the computer processor, cause the computer processor to implement:
an account processing center that is configured to receive a government entitlement check from a government entity, wherein the check has an associated owner, and wherein the check includes an identifier and the check further includes government mandated requirements restricting: division of the funds from the check into a plurality of deposit accounts, types of goods and services purchased by the funds of the check, reporting of expenditures to the government entity, and audit requirements for the owner of the check, and is further configured to prior to depositing the funds from the check into any of a plurality of deposit accounts, access a customer database to compare the identifier with customer information in the database to determine that funds from the check have been designated to be divided into sub-amounts, divide the funds from the check into sub-amounts based on determination, deposit the divided funds into the plurality of deposit accounts, each of the plurality of accounts having an account type and an associated expenditure designation, and based on information from the check of each type of associated expenditure designation and each account type;
wherein the account processing center is further configured to automatically transmit the report to the government entity and the owner of the check, conform to the government mandated reporting of expenditure associated with the check, and provide the owner of the check with information necessary to conform with the audit requirements; and
wherein the at least one of the plurality of deposit accounts is a pre-paid account.

18. The method of claim 17, wherein the pre-paid account is a stored value account.

19. The system of claim 17, wherein the deposited fund totals are year-to-date totals.

20. The system of claim 19, wherein the year-to-date totals are sub-divided based on the account type and type of associated expenditure designation of the plurality of accounts.

21. The system of claim 17, wherein the report includes searchable columns and rows.

22. The system of claim 21, wherein the report is storable by the searchable columns and rows.

23. A non-transitory machine-readable medium including sets of instructions which, when executed by a machine, cause the machine to:
receive, at a processing center having a processor, a direct deposit government entitlement check from a government entity to be deposited, wherein the check includes an identifier;
compare the identifier with a customer database to determine that funds from the check have been designated to be divided into sub-amounts and deposited into a plurality of accounts, each of the plurality of accounts having an account type and an associated owner, wherein the check includes an identifier and the check further includes government mandated requirements restricting: division of the funds from the check into a plurality of deposit accounts, types of goods and services purchased by the funds of the check, reporting of expenditures to the government entity, and audit requirements for the owner of the check;
prior to depositing the funds from the check into any of a plurality of deposit accounts, compare the identifier with a customer database to determine that funds from the check have been designated to be divided into sub-amounts;
divide the funds form the check into sub-amounts based on determination;
deposit the dividend funds into the plurality of deposit accounts, each of the plurality of deposit accounts having an account type and an associated expenditure designation;
based on information from the customer database, automatically deposit into at least one of the plurality of accounts at least a portion of the funds;

generate a report of a total amount deposited from the check of each type of associated expenditure designation and each account type;

automatically transmit the report to the government entity and the owner of the check;

conform to the government mandated reporting of expenditure associated with the check; and provide the owner of the check with information necessary to conform with the audit requirements;

wherein the at least one of the plurality of deposit accounts is a pre-paid account.

24. The non-transitory machine-readable medium of claim 23, wherein the check is a paper check.

25. The non-transitory machine-readable medium of claim 18, wherein the report includes year-to-date deposit totals.

26. A method for designating accounts for funds from a check to be deposited, the method comprising:

receiving, at a processing center having a computer processor, a direct deposit government entitlement check from a government entity to be deposited, wherein the check has an associated owner, wherein the check includes an identifier and the check further includes government mandated requirements restricting: division of the funds from the check into a plurality of deposit accounts, types of goods and services purchased by the funds of the check, reporting of expenditures to the government entity, and audit requirements for the owner of the check;

prior to depositing the funds from the check into any of a plurality of deposit accounts, comparing the identifier with a customer database to determine that funds from the check have been designated to be divided into sub-amounts for deposit into designated deposit accounts;

dividing, by computer processor, the funds from the check into designated sub-amounts based on determination;

depositing the divided funds into the plurality of designated deposit accounts, each of the plurality of designated deposit accounts having an account type and an associated expenditure designation, based on information from the customer database, automatically depositing into at least one of the plurality of deposit accounts at least a portion of the funds;

generating a report of a total amount deposited from the check of each type of associated expenditure designation and each account type;

automatically transmitting the report to the government entity and the owner of the check;

conforming to the government mandated reporting of expenditure associated with the check; and providing the owner of the check with information necessary to conform with the audit requirements;

wherein the check may be associated with a specified deposit account, and wherein, if comparing the identifier with a customer database determines that the check has not been designated to be divided into sub-amounts for deposit into designated deposit accounts, depositing the check into the specified deposit account.

* * * * *

UNITED STATES PATENT AND TRADEMARK OFFICE
CERTIFICATE OF CORRECTION

PATENT NO. : 8,473,413 B2
APPLICATION NO. : 13/727126
DATED : June 25, 2013
INVENTOR(S) : Dianna Lyons et al.

Page 1 of 1

It is certified that error appears in the above-identified patent and that said Letters Patent is hereby corrected as shown below:

In the Specification:

In the Background of the Invention:

Column 6, line 29, delete "ma" and insert --may--.

Column 6, line 60, delete "cheek" and insert --check--.

Column 8, line 1, delete "as" and insert --a--.

Signed and Sealed this
Twenty-fourth Day of September, 2013

Teresa Stanek Rea
*Deputy Director of the United States Patent and Trademark Office*